United States Patent
Huang et al.

(10) Patent No.: US 11,359,912 B1
(45) Date of Patent: Jun. 14, 2022

(54) TIME-OF-FLIGHT IDENTIFICATION SYSTEM AND IDENTIFICATION METHOD FOR WAREHOUSING AND FREIGHT TRANSPORTATION

(71) Applicants: MKDWELL (Jiaxing) Electronics Technology Co., Ltd., Jiaxing (CN); MKD Technology Inc., Hsinchu (TW); MKDWELL LIMITED, Shanghai (CN)

(72) Inventors: Ming Chia Huang, Hsinchu (TW); Hsin-Chi Hou, Hsinchu (TW); Chien-Ta Lee, Hsinchu (TW)

(73) Assignees: MKDWELL (Jiaxing) Electronics Technology Co., Ltd., Jiaxing (CN); MKD Technology Inc., Hsinchu (TW); MKDWELL LIMITED, Shanghai (CN)

( * ) Notice: Subject to any disclaimer, the term of this patent is extended or adjusted under 35 U.S.C. 154(b) by 0 days.

(21) Appl. No.: 17/302,776

(22) Filed: May 12, 2021

(51) Int. Cl.
| | | |
|---|---|---|
| *H04N 5/247* | (2006.01) | |
| *G01B 11/24* | (2006.01) | |
| *G01S 7/481* | (2006.01) | |
| *G01S 17/88* | (2006.01) | |
| *H04L 67/12* | (2022.01) | |

(52) U.S. Cl.
CPC ............ *G01B 11/24* (2013.01); *G01S 7/4815* (2013.01); *G01S 17/88* (2013.01); *H04L 67/12* (2013.01); *H04N 5/247* (2013.01)

(58) Field of Classification Search
CPC ....... G01B 11/24; G01S 7/4815; G01S 17/88; H04L 67/12; H04N 5/247
USPC ......................................................... 348/135
See application file for complete search history.

(56) References Cited

U.S. PATENT DOCUMENTS

2018/0197139 A1* 7/2018 Hill ...................... G06T 7/0004

* cited by examiner

*Primary Examiner* — Nguyen T Truong
(74) *Attorney, Agent, or Firm* — Wang Law Firm, Inc.

(57) ABSTRACT

A time-of-flight identification system and method for warehousing and freight transportation are provided by assembling an optical identification device in a container. The optical identification device includes a first, a second, and a third image capturing units, a beam receiving and calibrating unit, an estimation and processing unit, a transmission module and a power supply module. The optical identification device is connected to a monitoring device via signals; wherein the optical identification device is used to perform multi-segment space flight time identification method for logistics managers or inventory personnel to check whether inventory personnel correctly store the goods in storage space inside the container; to improve space utilization rate for the container. The present invention can be installed in: truck container, refrigerated truck container, truck rear cargo container, port centralized container, so as to promote cargo management efficiency and safety.

10 Claims, 9 Drawing Sheets

TIME-OF-FLIGHT IDENTIFICATION SYSTEM AND IDENTIFICATION METHOD FOR WAREHOUSING AND FREIGHT TRANSPORTATION

BACKGROUND OF THE INVENTION

1. Field of the Invention

The present invention relates generally to an identification system for warehousing and freight transportation, and more particularly, to a time-of-flight identification system and identification method for warehousing and freight transportation.

2. The Prior Arts

The traditional approach to manage the size information of freight and baggage is through manual operation. Following the standard operating procedures defined by each agency, the sizes of the items are measured manually in sequence, and are recorded as relevant electronic data for use in subsequent logistics operations. Obtaining relevant feature information of objects through manual operation requires a lot of manpower and man-hours, which is a burden to business cost. It has become an indispensable demand to build an automatic system that can obtain the three-dimensional size information and other appearance feature information of objects for transportation and logistics, storage industry, and so on.

Furthermore, the use of container trucks for logistics is common, with various sizes ranging from large container to small container trucks. The most common problem with such container trucks is that the goods are difficult to be effectively categorized when placed, and the space planning is often insufficient, so that there are different trucks delivering and unloading different goods for the same store, resulting in huge labor costs and management costs, which fails to effectively meet the requirements for cost control. The problem is that the traditional approach used by container trucks is to pile all the goods together and the goods are effectively classified, which seriously affects the timeliness of the goods delivery. Also, when the truck space is half empty after half of the goods are already unloaded and delivered, the goods will be scattered inside the truck space and collide with one another during transportation, resulting in damage and difficult to handle. The waste of space causes more transportation costs, which counteracts with the intended economic benefits.

In general, when the logistics company calculates the freight, the consignee usually uses a measuring ruler to measure the length, width, and height of an item, and then calculates the volume size based on the measured length, width and height of the item to determine how much fee to charge for the item. And for the on-site operation of the container, it is necessary to measure the length of the cargo and the width at different heights point by point, and finally form the basic parameters and outline size data of the item size, and calculate the item over-size level according to the proposed loading space. At present, some tools for measuring oversize item include, such as, the use of bubble levels, steel tapes, pendant hammers and other tools for measurement.

Moreover, when surveyors of the item must climb the top and sides of the item, there are certain hidden labor safety hazards. In addition, some of the item size data needs to be measured in sections, and then the data is added and subtracted, and the collected data is sampled. Manual recording and calculation errors may occur. Furthermore, the calculation process of freight charges reveals that the calculation of freight charges by manual processing of items may result in short freight charges, due to the negligence of manual operations, which in turn causes losses to the logistics provider. The manual methods are more error-prone and slow in processing speed. Therefore, for the logistics industry, improving the existing operating system is imperative.

Therefore, the inventor of the present invention observed the above-mentioned deficiencies, and proposed the present invention.

SUMMARY OF THE INVENTION

A primary objective of the present invention is to provide a time-of-flight identification system and identification method for warehousing and freight transportation, which can quickly obtain information about the container size of the internal space occupied by cargo goods, and apply to only the size required by the goods so as to provide the packaging or storage space configuration for the transportation, logistics, and warehousing industries.

To achieve the aforementioned objective, the present invention provides a time-of-flight identification system for warehousing and freight transportation, comprising: at least one container having a bottom wall, the bottom wall having four sides, at least three side panels arranged on three of the four sides, a top panel arranged on the side panels to form a storage opening for the container; the storage opening provided with a door, and the inside of the container forming an accommodating space to store a plurality of objects, and the container being respectively defined with a plurality of assembly terminals on the storage opening, the side of the central top panel and the sides of the side panels;

At least one optical identification device, assembled at one of the assembly terminals, and comprising: at least one first image capturing unit, at least one second image capturing unit, and at least one third image capturing unit, a beam receiving and calibrating unit, an estimation and processing unit, at least one transmission module, and a power supply module, wherein: the image capturing units emitting a plurality of laser beams or a plurality of LED beams onto the contours and spatial dimensions of the plurality of objects in the accommodating space, and capturing a plurality of spatial image information, the wavelength range of the laser beams ranging from 1300 nm to 1400 nm; the beam receiving and calibrating unit being coupled to the image capturing units and used to use at least one spatial image information of a reference object with built-in length, width, and height dimensions, to obtain a spatial scale information for calibrating a scale, and converting the corresponding transmission and reflection paths of the laser beams or the LED beams into a plurality of first structured beams, a plurality of second structured beams, and a plurality of third structured beams for calculating to form a plurality of object image information and a plurality of beam flight time information; the estimation and processing unit being coupled to the beam receiving and calibrating unit, used to receive the plurality of object image information and the plurality of beam flight time information provided by the image capturing units, and forming at least one storage location information of the object under measurement in measurement environment and at least one container volume information; the transmission modules being respectively coupled to the first image capturing unit, the second image capturing unit, the third image capturing unit, the beam receiving and calibrating unit, and the estimation and processing unit; and the power supply module being coupled to the transmission module; and At least one monitoring device, connected to the transmission module to receive the storage location information and the container volume information.

Furthermore, based on the aforementioned time-of-flight identification system for warehousing and freight transportation, the present invention further provides an identification method of the time-of-flight identification method for warehousing and freight transportation, comprising:

The image capturing unit of the optical identification device emitting a plurality of laser beams or a plurality of LED beams onto the contours and spatial dimensions of the plurality of objects in the accommodating space, the wavelength range of the laser beams ranging from 1300 nm to 1400 nm;

Scanning the contour of the plurality of objects to be loaded and the internal size of the accommodating space, and capturing a plurality of spatial image information;

Obtaining contour data of the objects to be loaded, wherein the beam receiving and calibrating unit using a spatial image information of at least one reference object with built-in length, width, and height dimensions to obtain spatial scale information to calibrate a scale; the beam receiving and calibrating unit converting the corresponding transmission and reflection paths of the laser beams into a plurality first structured beams, a plurality of second structured beams, and a plurality of third structured beam, and calculating to form a plurality of image information of the object to be loaded and a plurality of beam flight time information;

The estimation and processing unit receiving the plurality of image information of the object to be measured and a plurality of beam flight time information provided by the image capturing units to calculate and process to form a plurality of storage location information of the object to be loaded in a measurement environment and a plurality of container volume information;

The optical identification device performing an identification process based on the storage location information and the container volume information to determine whether loading space satisfying loading requirement and whether the total weight exceeding the load-limit of the container; when the loading space not satisfying the loading requirement, the transmission module sending an alarm notification message to the monitoring device; when the loading space satisfying the loading requirement, the transmission module sending a full-load notification message to the monitoring device; when the total weight exceeding the load-limit of the container, the transmission module sending a full-load notification message to the monitoring device.

The time-of-flight identification system and identification method for warehousing and freight transportation provided by the present invention are mainly achieved by arranging the optical identification device in the storage opening, and using the optical identification device to perform the identification of the plurality of objects inside the container for the logistics manager or inventory personnel to check whether the inventory personnel correctly store the objects in the accommodating space inside the container, so that more goods can be carried, and the number of deliveries can be reduced to reduce transportation costs, which is economical.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
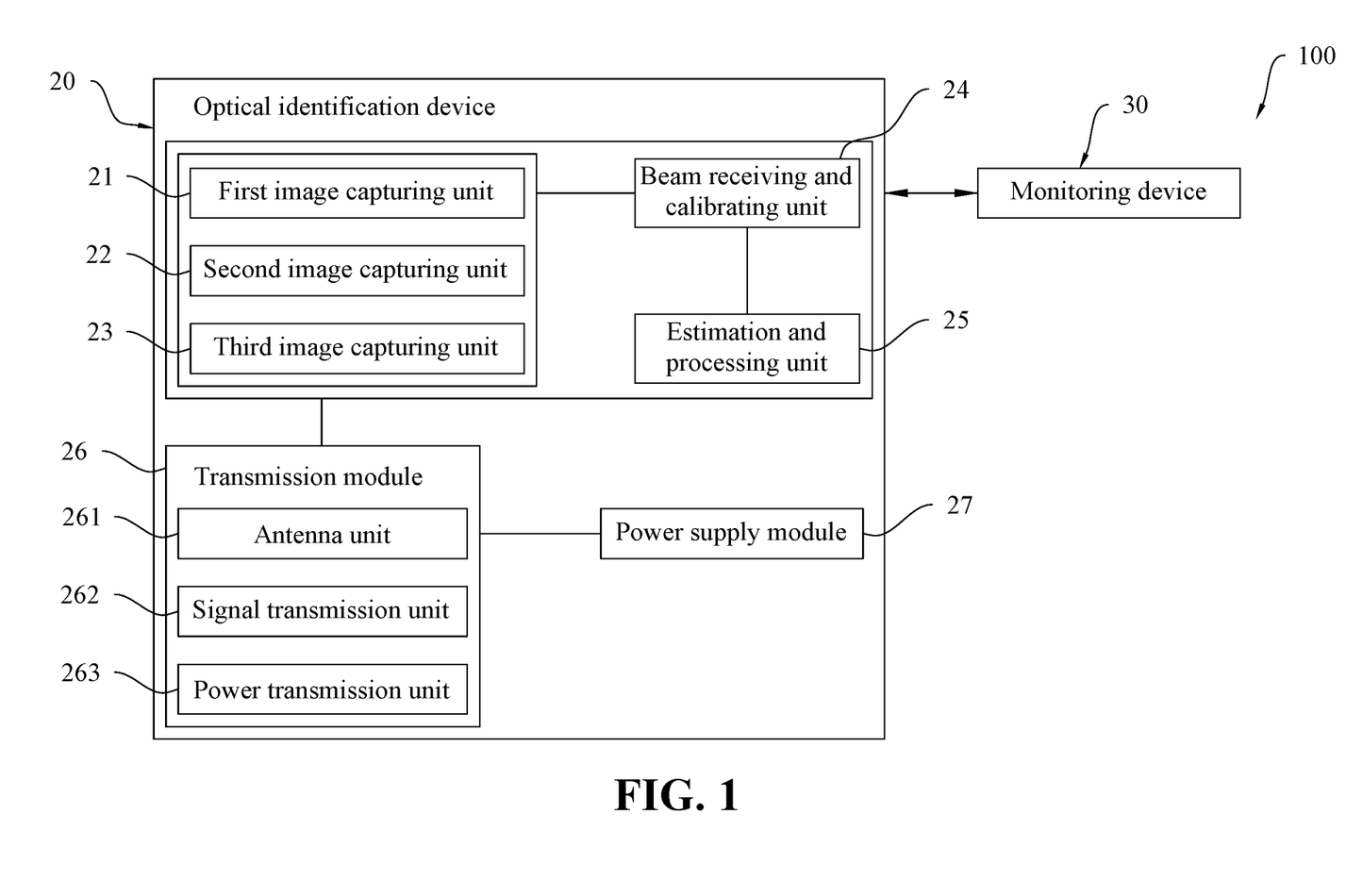
FIG. 1 is a system block diagram of the first embodiment of the present invention.
Figure 2:
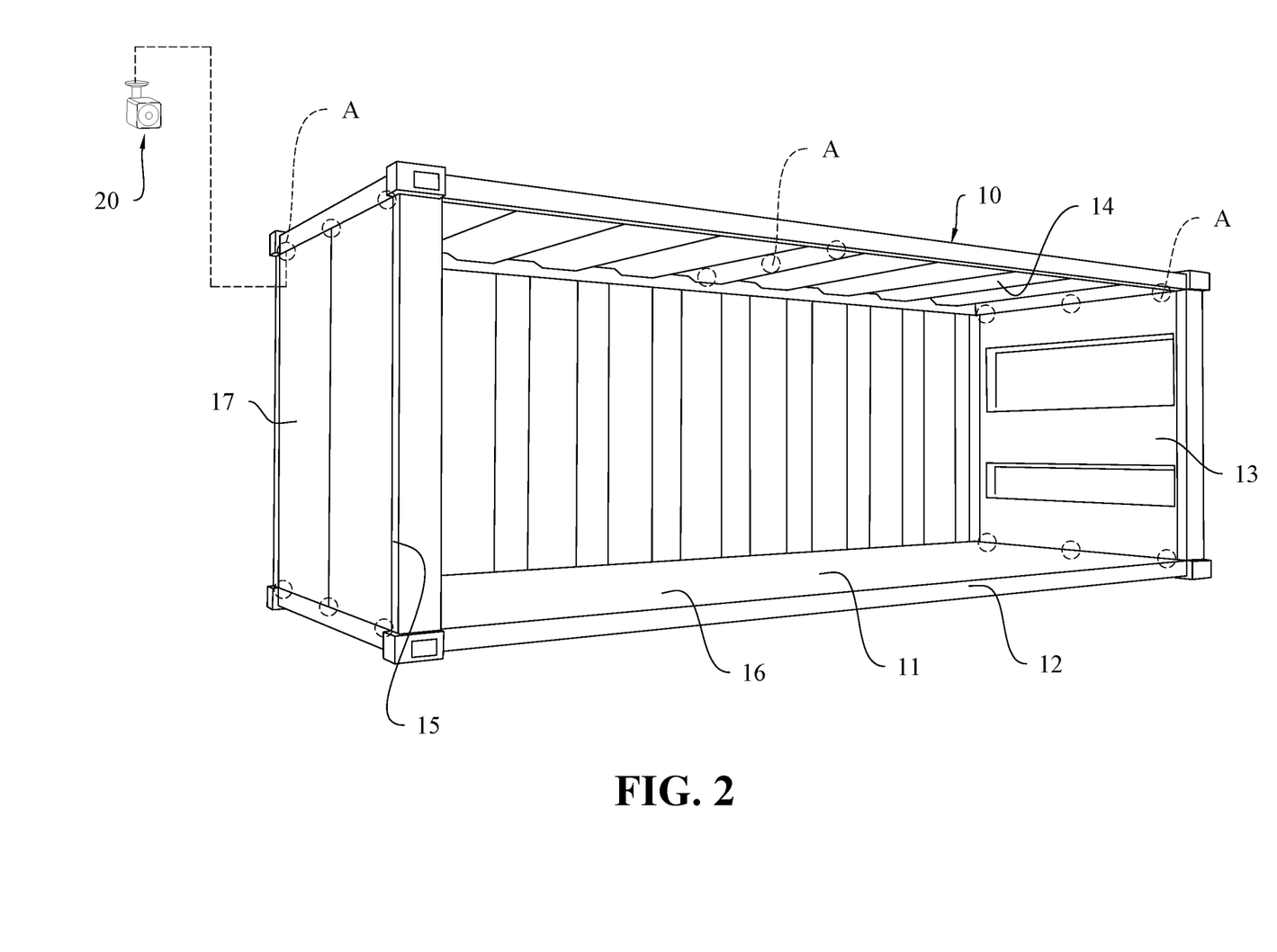
FIG. 2 is an exploded perspective view showing the container and the optical identification device in the first embodiment of the present invention.
Figure 3:
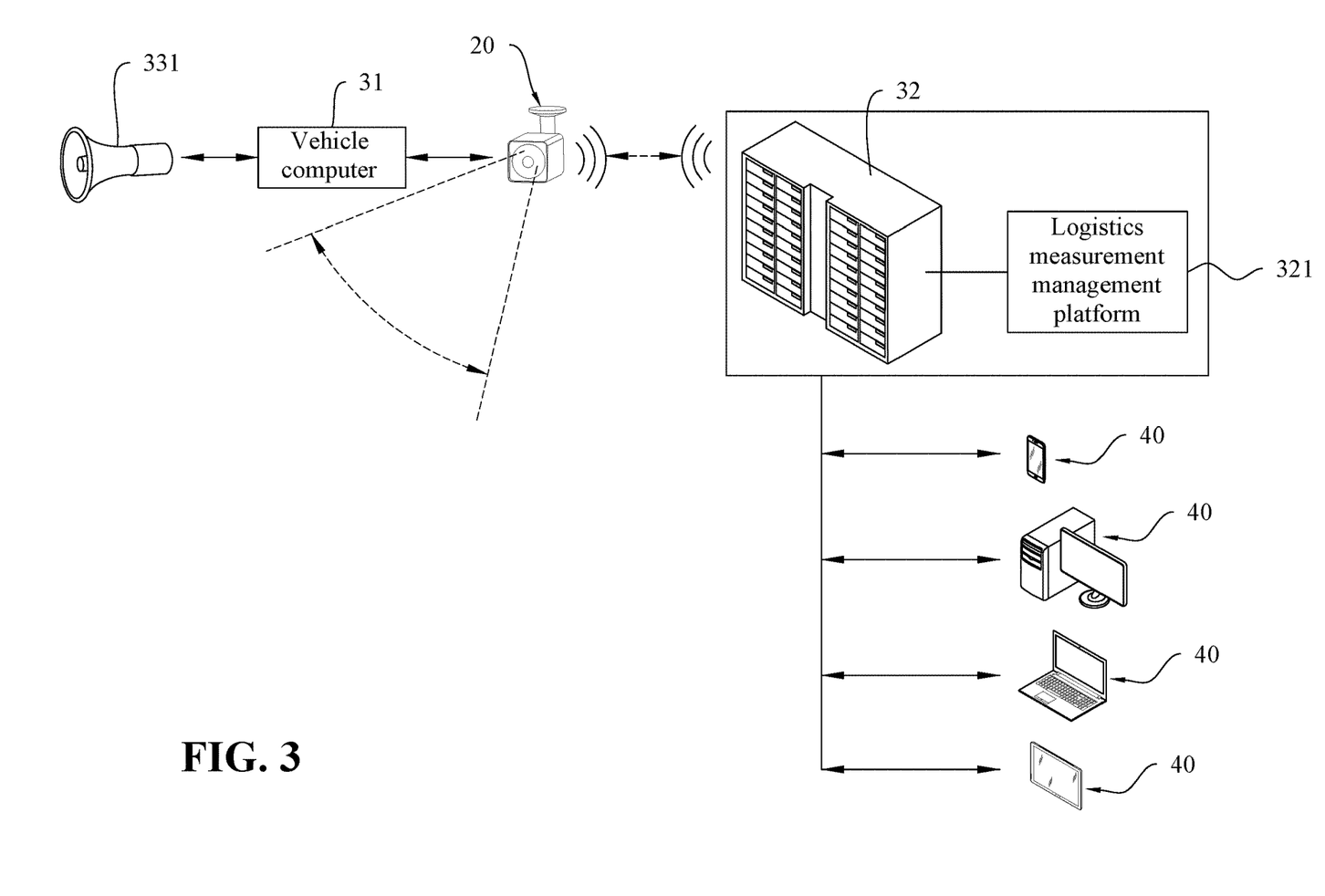
FIG. 3 is a schematic view of the system architecture of the first embodiment of the present invention.
Figure 4:
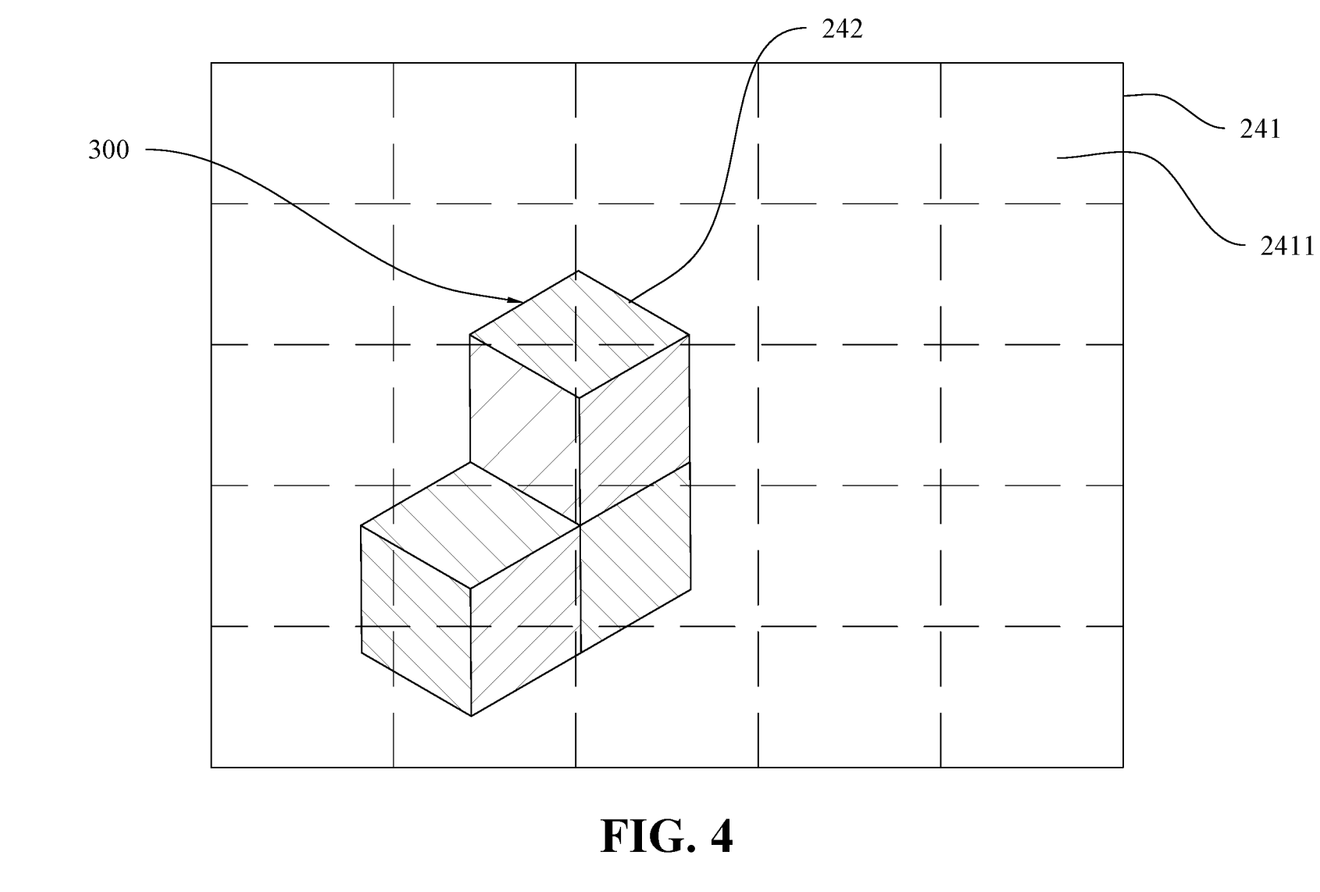
FIG. 4 is a schematic view of the identification of the projection area of the displayed image in the first embodiment of the present invention.
Figure 5:
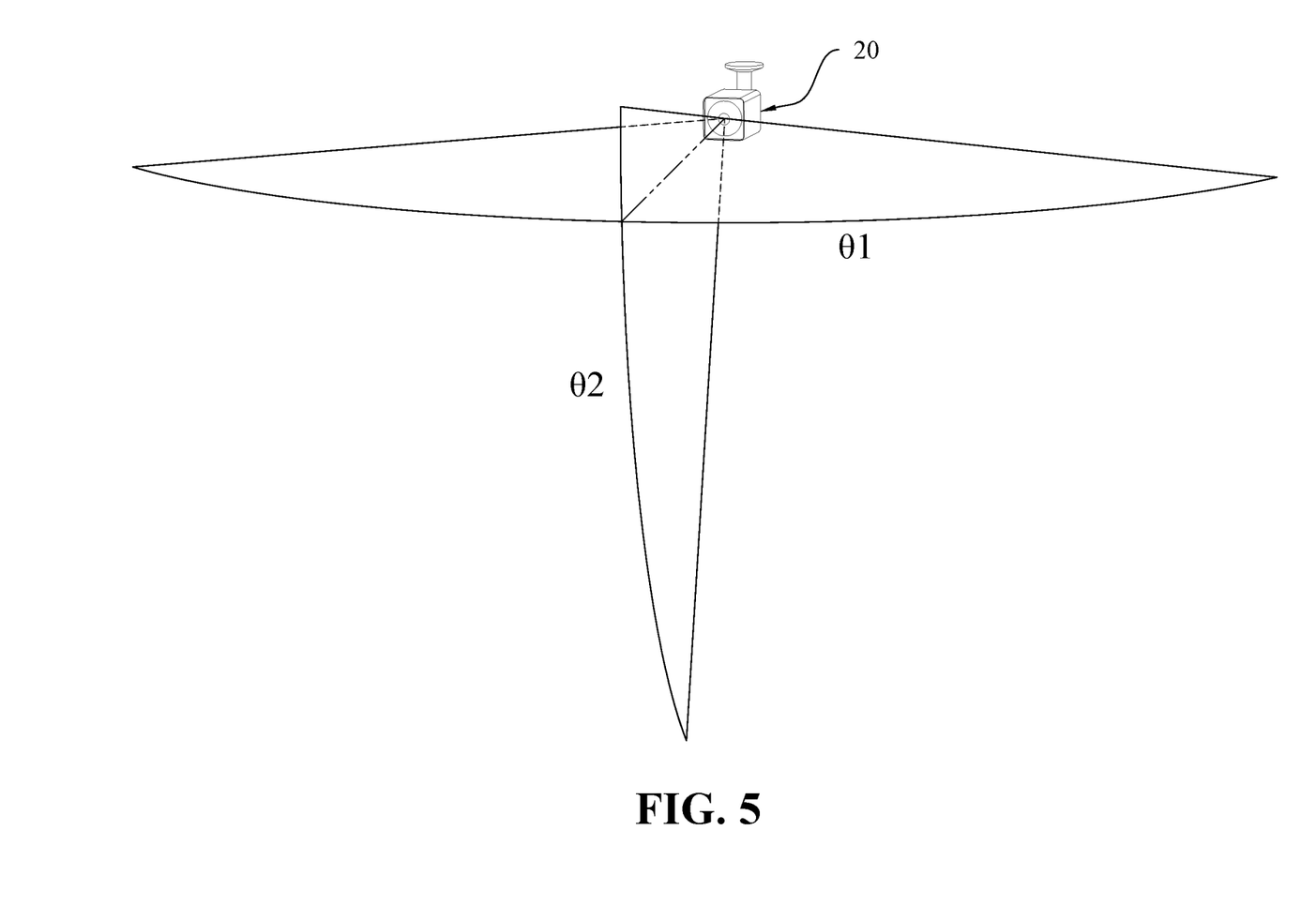
FIG. 5 is a schematic view of the identification state of the optical identification device according to the first embodiment of the present invention.

Referring to FIG. 1 and FIG. 2, in combination with FIG. 3 and FIG. 4, FIG. 1 is a system block diagram of the first embodiment of the present invention; FIG. 2 is an exploded perspective view showing the container and the optical identification device in the first embodiment of the present invention; FIG. 3 is a schematic view of the system architecture of the first embodiment of the present invention; FIG. 4 is a schematic view of the identification of the projection area of the displayed image in the first embodiment of the present invention. The present invention provides a time-of-flight identification system 100 for warehousing and freight transportation, comprising:

A container 10, having a bottom wall 11, the bottom wall 11 having four sides 12, at least three side panels 13 arranged on three of the four sides 12, a top panel 14 arranged on the side panels 13 to form a storage opening 15 for the container 10. The storage opening 15 is provided with a door 17 for opening and closing, and the inside of the container 10 forms an accommodating space 16 to store a plurality of objects 300, such as boxes. The container 10 is respectively defined with a plurality of assembly terminals A on the storage opening 15, the side of the central top panel and the sides of the side panels 13. In the present embodiment, the container can be a cargo container of a truck, a freezer of a refrigerated truck, or a centralized container at a port. The present invention takes the container of a truck as an example, but does not limit the implementation of the present invention.

At least one optical identification device 20, as shown in FIGS. 1-3, assembled at one of the assembly terminals A of the storage opening 15. The optical identification device 20 comprises: at least one first image capturing unit 21, at least one second image capturing unit 22, and at least one third image capturing unit 23, a beam receiving and calibrating unit 24, an estimation and processing unit 25, at least one transmission module 26, and a power supply module 27; wherein:

The image capturing units emitting a plurality of laser beams or a plurality of LED beams onto the contours and spatial dimensions of the plurality of objects 300 in the accommodating space 16, and capturing a plurality of spatial image information, the wavelength range of the laser beams ranging from 1300 nm to 1400 nm; wherein the image capturing units are provided with a plurality of laser diodes (not shown). These laser diodes are mainly made of AlGaInAs and InGaAsP material series, and require operating power greater than tens of mW to more than 1 W. The most important criterion in the present invention is to use a single-mode, frequency-stabilized laser diode with a beam wavelength of 1310 nm as the emitting light source; in addition, these laser diodes are a plurality of semiconductor lasers or a plurality of light-emitting diodes arranged in an array. For example, the semiconductor lasers can be vertical-cavity surface-emitting lasers (VCSEL) or photonic crystal laser.

Moreover, the present invention uses light source of 1300 nm to 1400 nm wavelength. The main feature is that it can generate lasers of the plurality of wavelengths at the same time. The wavelength distribution is based on the center frequency, and lasers of other wavelengths are generated every 3 nm or 6 nm. If the center wavelength is 1315 nm, the lasers of other wavelengths can be 1318/1315/1312/1309 and so on. More specifically, it provides the multi-mode (wavelength) characteristics when in use. More important, human eyes are generally sensitive for purple light with a wavelength of 400 nm to red light with a wavelength of 700 nm. The wavelength used in the present invention is far higher and is invisible to the naked eye, the eyes of the staff are protected.

Figure 6:
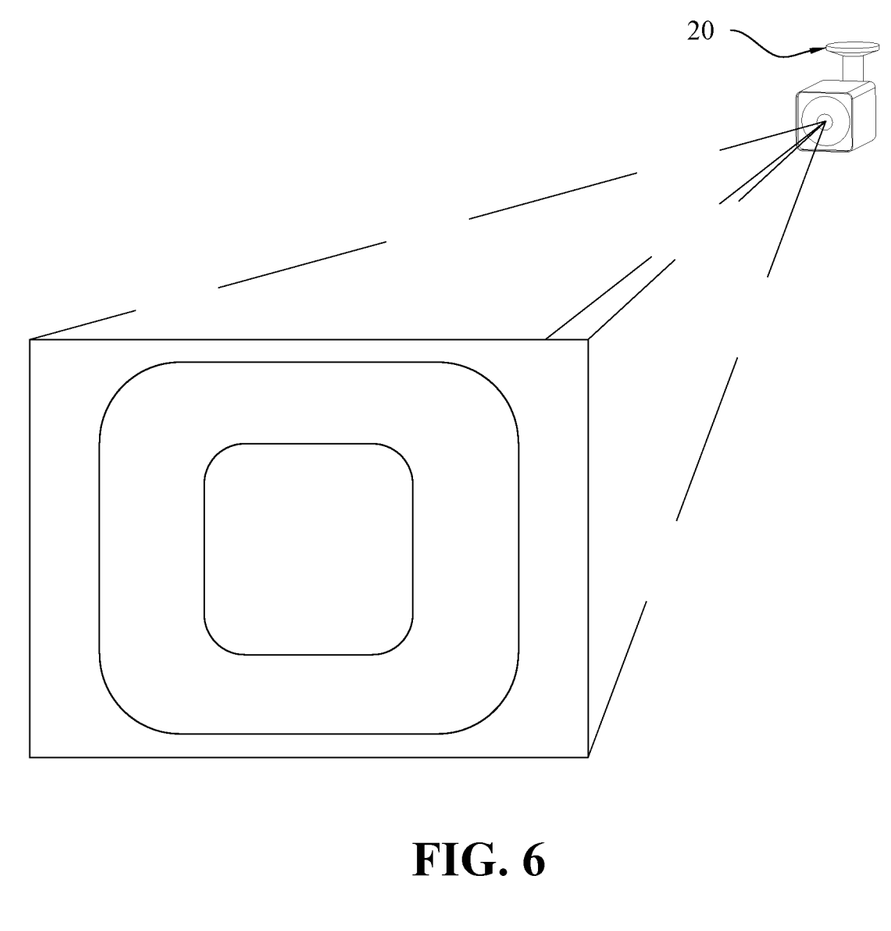
FIG. 6 is a schematic view of the identification range of the image capturing unit according to the first embodiment of the present invention.
Figure 7:
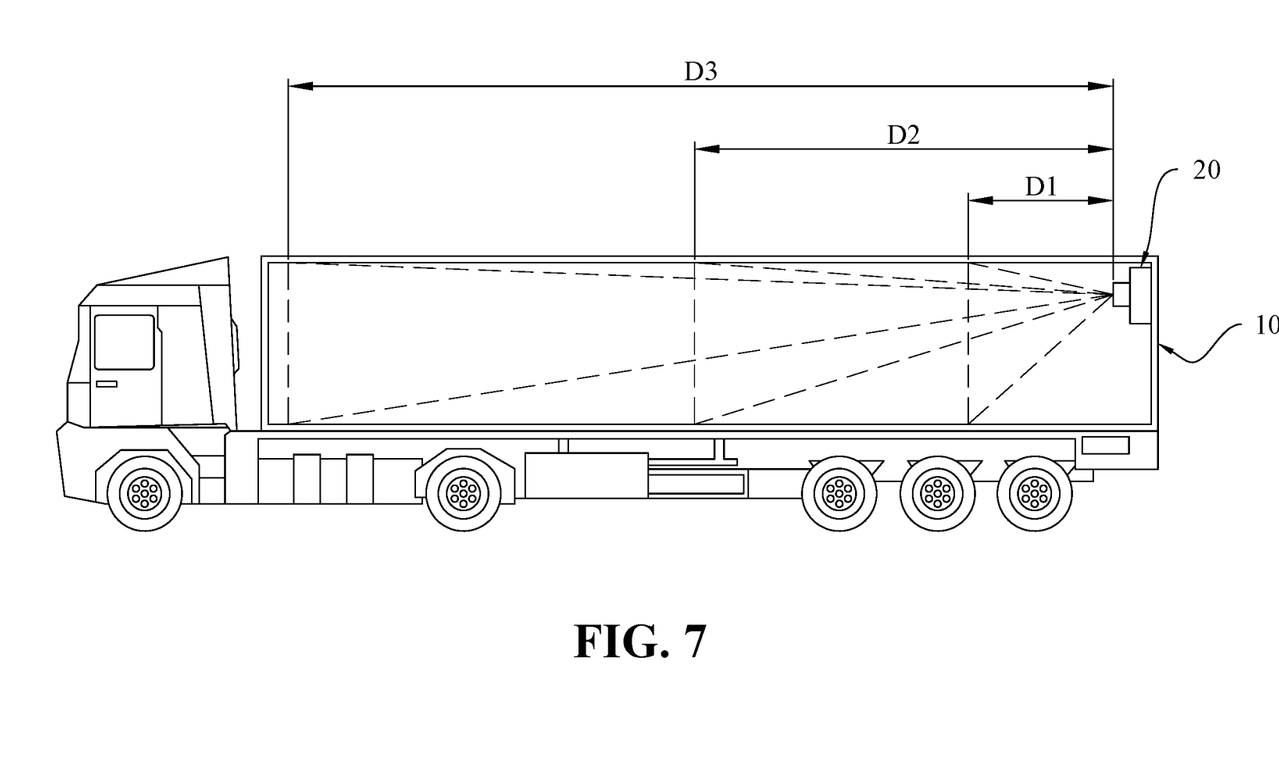
FIG. 7 is a schematic view of the use state of the first embodiment of the present invention.

In the present embodiment, the horizontal viewing angle θ1 of the field of view (FOC) of the optical identification device 20 ranges from 0 to 120 degrees, and the vertical viewing angle θ2 ranges from 0 to 90 degrees. In addition, as shown in FIGS. 6 and 7, the wavelength of the laser beams is 1310 nm, and the first image capturing unit 21 is used to identify the space range D1 from the storage opening 15 to within 5 meters, and the second image capturing unit 22 is used to identify the space range D2 from the storage opening 15 to within 10 meters. In addition, the third image capturing unit 23 is used to identify the space range D3 from the storage opening 15 to within 18 meters. More specifically, the image capturing units 21, 22, and 23 as shown in FIGS. 6 and 7 can be used to identify a plurality of locations and ranges of the accommodating space 16, and the present invention can be applied to the most types of container 10. If the container 10 is too large, a plurality of optical identification devices 20 can be installed in the container 10.

The beam receiving and calibrating unit 24 is coupled to the image capturing units 21, 22, and 23, and is used to obtain a spatial scale by using a spatial image information of at least one reference object with built-in length, width, and height. The corresponding transmission and reflection paths of the laser beams are converted into a plurality of first structured beams, a plurality of second structured beams, and a plurality of third structured beams, and are calculated to form a plurality of images information of the objects 300 and a plurality of beam flight time information.

In the present embodiment, as shown in FIG. 4, the plurality of structured beams are projected into an image projection area 241 and form a plurality of superimposed patterns 242. The image projection area 241 has a plurality of sub-projection areas 2411 arranged in an array and adjacent to one another, and the pattern distribution of the superimposed pattern 242 in each sub-projection area 2411 is different from one another, and the image information of the objects 300 and the beam flight time information are formed by calculation. More specifically, the present invention can identify the depth information of the illuminated object 300 based on the difference in the pattern distribution and the amount of change in each projection area.

In addition, the calculation of the depth information also includes that the laser beams reflected from the target arrive at the beam receiving and calibrating unit 24 (for example, a photodetector), and is converted to electric signal output to stop the time counting, so as to know the beam flight time. The distance R to the reflection point can be calculated by measuring the round-trip ToF Δt time. The distance R is determined by the following formula:

$$R = \frac{1}{2n}c\Delta t$$

In the formula, c is the speed of light in vacuum, n is the refractive index of the propagation medium (approximately 1 for air). There are two factors that affect the distance resolution ΔR: the uncertainty δΔt when measuring Δt and spatial error w (w=cτ) caused by pulse width.

The estimation and processing unit 25 is coupled to the beam receiving and calibrating unit 24, and the estimation and processing unit 25 is configured to receive and process a plurality of image information of the objects 300 and a plurality of beam flight time information provided by the image capturing units 21, 22, 23 to form at least one storage location information and at least one container volume information of the objects 300 in the measurement environment.

The transmission module 26 is respectively coupled to the first image capturing unit 21, the second image capturing unit 22, the third image capturing unit 23, the beam receiving and calibrating unit 24, and the estimated and processing unit 25. In the present embodiment, the transmission module 26 includes at least one antenna unit 261, at least one signal transmission unit 262, and at least one power transmission unit 263. The transmission module 26 is used to perform information transmission through wireless signals or wired signals.

The power supply module 27 is coupled to the transmission module 26. In the present embodiment, the power supply module 27 can be powered by an internal replaceable battery or connected to an external power cord. The present invention takes the replaceable battery power supply mode as an example, but does not limit the implementation of the present invention.

A monitoring device 30, as shown in FIG. 3, the monitoring device 30 is connected to the transmission module 26 through signal to receive the storage location information and the container volume information. In the present embodiment, the transmission module 26 can be connected to two monitoring devices 30, and the monitoring device 30 is one of a vehicle computer 31 or a server 32.

When the monitoring device 30 is a vehicle computer 31, the container 10 is installed on a vehicle carrier, and the transmission module 26 is connected to at least one control area network bus of the monitoring device 30 in the vehicle carrier. The control area network bus is one or a combination of a Local Interconnect Network (LIN) and a Controller Area Network (CAN). In addition, the transmission module 26 can be connected to the monitoring device 30 through the signal transmission unit 262 with Ethernet signals; in addition, the vehicle computer 31 is connected to a speaker device 311, and the speaker device 311 can be a horn or a buzzer device.

When the monitoring device 30 is a server 32, a logistics measurement management platform 321 is installed in the server 32. The information transmission of the wireless signal of the monitoring device 30 is the antenna unit 261, which is selected from one of the wireless communication protocols, including Bluetooth, third-generation mobile communications (3G), fourth-generation mobile communications (4G), wireless local area network (Wi-Fi), wireless local area network (WLAN), fifth-generation mobile communications (5G) for connection to the server 32 through signal. The information transmission of the wired signal of the monitoring device 30 is that the transmission module 26 connects to the server 32 through the signal transmission unit 262 with an Ethernet signal. In the present embodiment, the logistics industry can use at least one external electronic device 40 to connect to the server 32 via signal to obtain the relevant monitored logistics information of the logistics measurement management platform 321, and the electronic device 40 is one of a smart phone, a tablet computer, a desktop computer or a notebook computer.

Figure 8:
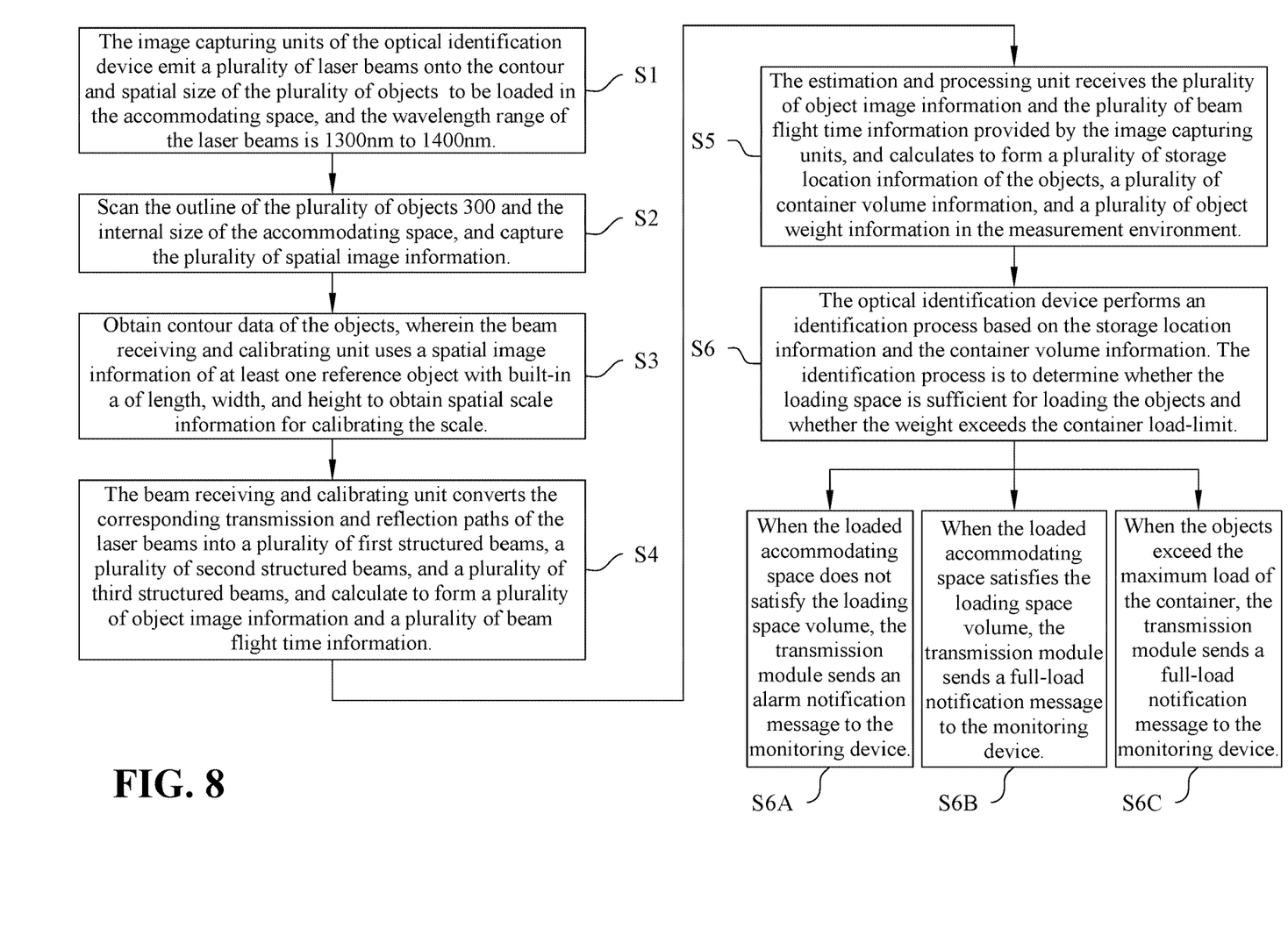
FIG. 8 is a schematic view of the flowchart of the identification method according to the first embodiment of the present invention.

Furthermore, based on the aforementioned time-of-flight identification system 100 for warehousing and freight transportation, the present invention further provides an identification method 200 of the time-of-flight identification system for warehousing and freight transportation, as shown in FIG. 8, the identification method 200 comprises:

Step S1: The image capturing units of the optical identification device 20 emit a plurality of laser beams onto the contour and spatial size of the plurality of objects 300 to be loaded in the accommodating space 16, and the wavelength range of the laser beams is 1300 nm to 1400 nm.

Step S2: Scan the outline of the plurality of objects 300 and the internal size of the accommodating space 16, and capture the plurality of spatial image information.

Step S3: Obtain contour data of the objects 300, wherein the beam receiving and calibrating unit 24 uses a spatial image information of at least one reference object with built-in a of length, width, and height to obtain spatial scale information for calibrating the scale.

Step S4: The beam receiving and calibrating unit 24 converts the corresponding transmission and reflection paths of the laser beams into a plurality of first structured beams, a plurality of second structured beams, and a plurality of third structured beams, and calculate to form a plurality of object image information and a plurality of beam flight time information.

Step S5: The estimation and processing unit 25 receives the plurality of object image information and the plurality of beam flight time information provided by the image capturing units 21, 22, 23, and calculates to form a plurality of storage location information of the objects 300, a plurality of container volume information, and a plurality of object weight information in the measurement environment.

Step S6: The optical identification device 20 performs an identification process based on the storage location information and the container volume information. The identification process is to determine whether the loading space is sufficient for loading the objects 300 and whether the weight exceeds the container 10 load. In the present embodiment, step S6 includes three sub-steps, which are:

Step S6A: When the loaded accommodating space 16 does not satisfy the loading space volume, the transmission module 26 sends an alarm notification message to the monitoring device 30.

Step S6B: When the loaded accommodating space 16 satisfies the loading space volume, the transmission module 26 sends a full-load notification message to the monitoring device 30.

Step S6C: When the objects 300 exceed the maximum load of the container 10, the transmission module 26 sends a full-load notification message to the monitoring device 30.

In the present embodiment, when the alarm notification information and the full-load notification information are transmitted to the monitoring device 30, the alarm notification information and the full-load notification information issue a warning pattern in the interface of the logistics operation management platform 321 issues when the monitoring device 30 is the server 32; in addition, when the monitoring device 30 is a vehicle computer 31, the alarm notification information and the full-load notification information can be sounded through the speaker device 311 or displayed on a car smart screen (not shown).

In the present embodiment, the cargo information is calculated as a plurality of cargo information stored inside the monitoring device 30, the cargo information includes the internally stored materials, the size of the cargo, and the materials, etc., for the beam receiving and calibrating unit 24 and the estimated and processing unit 25 to obtain through the transmission module 26. Then, the cargo information is processed with the structured beams for calculation, and then processed by the estimated and processing unit 25 to obtain the plurality of storage location information, the plurality of container volume information, and the plurality of object weight information.

In order to provide a further understanding of the structural features of the present invention, the use of technical means and the expected effects, the use of the present invention is described. It is believed that a more in-depth and specific understanding of the present invention can be obtained from the following:

Referring to FIGS. 1 and 3, together with FIGS. 4, 6 and 7, which are the system block diagram, system architecture diagram, image projection area 241 identification diagram, schematic view of the identification range of the image capturing units and schematic view of use state of the first embodiment of the present invention. As shown previously, it can be further understood that the present invention is mainly achieved by arranging the optical identification device 20 in the storage openings 15 and using the optical identification device 20 to identify the objects 300 inside the container 10.

Wherein, the paths of the laser beams corresponding to the transmission and reflection are converted into a plurality of first structured beams, a plurality of second structured beams, and a plurality of third structured beams, and the structured beams are projected on the image projection area 241, to form a plurality of superimposed patterns 242, the pattern distribution of the superimposed patterns 242 in each sub-projection area is different from one another, and the image information of the objects and the beam flight time information are formed by calculation. More specifically, the present invention can identify the depth information of the illuminated object 300 based on the difference in the pattern distribution and the amount of change in each projection area.

After the plurality of object image information and the plurality of beam flight time information are formed by calculation, the storage location information and container volume information in the internal measurement environment of the container 10 are obtained by calculation. Then, the storage location information and the container volume information are returned to the monitoring device 30 for the logistics manager or inventory personnel to check whether the inventory personnel correctly store the objects in the accommodating space 16 inside the container 10.

It should be further explained that as shown in FIGS. 4, 6 and 7, the present invention shows that the first image capturing unit 21 is used to identify the space range D1 from the storage opening 15 to within 5 meters, the second image capturing unit 22 is used to identify the space range D2 from the storage opening 15 to within 10 meters, and the third image capturing unit 23 is used to identify the space range D3 from the storage opening 15 to within 18 meters. In other words, the present invention can identify a plurality of monitored spaces, so as to achieve complete and accurate distancing of laser time-of-flight identification.

As such, the present invention can identify whether the size of the objects (for example, goods) stored in the container 10 is greater than the preset space occupancy rate, so as to selectively send alarm notifications according to the preset space conditions. Therefore, the present invention can enable the container 10 to carry more articles, reduce the number of transportations to reduce transportation costs, and has economic benefits.

It is worth noting that the wavelength of the laser used for identification in general mobile phones or monitoring equipment is 940 nm, and infrared lasers of this wavelength have also been medically proven to be harmful to the human eye, causing cataracts and retina burns. In contrast, the wavelength of the laser beams used in the present invention is 1310 nm; more specifically, it is harmless to the eyes of cargo transporters.

Figure 9:
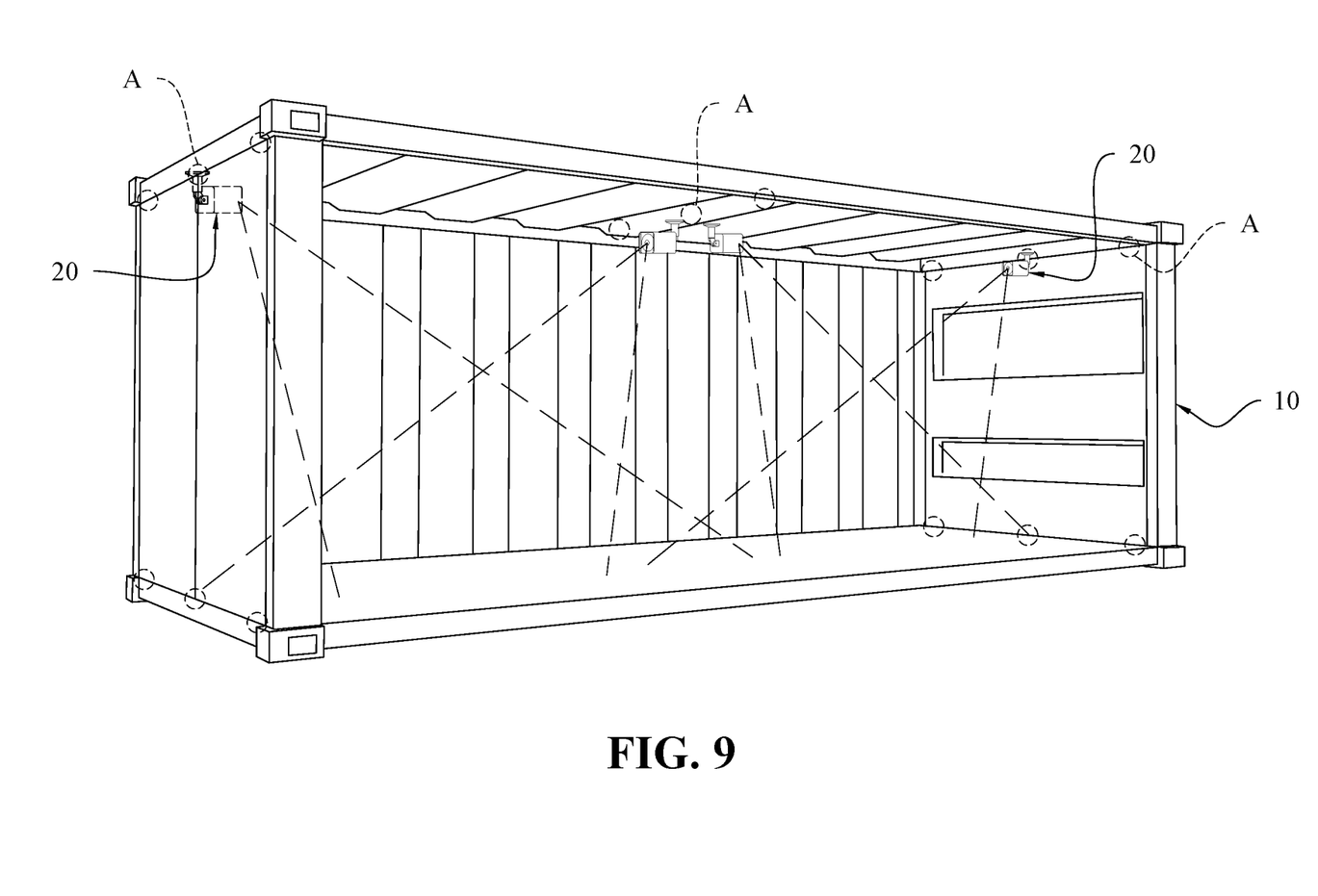
FIG. 9 is a schematic view of the use state of the second embodiment of the present invention.

Referring to FIG. 9, which is a schematic view of the use state of the second embodiment of the present invention. Compared with the first embodiment, the difference between the present embodiment and the first embodiment is that: the container 10 is disposed with an optical identification device 20 in the storage opening 15 and the assembly contact point at the center of the top side of the side panel 13 respectively, and the top side at the center of the container 10 is disposed with two optical identification devices 20. As the figure clearly shows, the present embodiment can completely identify the goods and the internal space of the container 10 without blind spots, and then the estimation and processing unit 25 can be used to accurately calculate and process the overlapped areas identified by the optical identification devices 20 to accurately form the storage location information and container volume information of the object 300 in the measurement environment.

It is worth noting that the optical identification device 20 of the present invention can not only perform time-of-flight identification through laser beams; in addition, the present invention also utilizes the emission of the LED beams to detect the plurality of objects 300 inside the container 10 for distance measurement by time-of-flight.

The characteristics of the present invention and the expected effects that can be achieved are stated as follows:

The time-of-flight identification system 100 and identification method 200 for warehousing and freight transportation of the present invention are mainly based on the aforementioned identification method 200 and the system architecture, and the optical identification devices 20 provided and assembled in the storage opening 15 are used to perform multi-space time-of-flight identification of the plurality of objects 300 inside the container 10, so that the logistics manager or inventory personnel can check whether the inventory personnel correctly store the contents to the accommodating space 16 of the container 10.

The present invention has the following implementation effects and technical effects:

First, the present invention can quickly obtain information on the size of the internal space occupied by the object 300 in the container 10, and apply to using only the size of the space occupied by the goods, so as to provide packaging or storage space configuration for goods in the transportation, logistics, and warehousing industries.

Second, the present invention provides the logistics industry with the capability to quickly calculate the area and volume of the object within the error range acceptable to the logistics industry, monitor the space utilization rate with the measurement information, and provide the logistics industry back-end to check whether the inventory personnel has effectively stored the objects in the accommodating space 16 inside the container 10.

Third, the present invention has practical and diversified application characteristics. The present invention can be installed in: truck containers, refrigerated truck containers, truck-mounted containers, and port centralized container, so that the goods can be effectively classified and managed, to provide effective use of energy and improve the efficiency and safety of goods management.

Fourth, the present invention has the advantages of high space utilization, accurate cargo volume identification efficiency, and low calculation amount for the container 10 through the time-of-flight identification of multi-segment spaces.

In summary, the present invention has excellent advanced practicality among similar products. Also, the domestic and foreign technical data on such structures have not been found in the literature. The same structure has not been found in the literature. Therefore, the present invention meets the requirements for an invention patent, and an application is filed in accordance with the law.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A time-of-flight identification system for warehousing and freight transportation, comprising:
   at least one container having a bottom wall, the bottom wall having four sides, at least three side panels arranged on three of the four sides, a top panel arranged on the side panels to form a storage opening for the container; the storage opening provided with a door, and the inside of the container forming an accommodating space to store a plurality of objects, and the container being respectively defined with a plurality of assembly terminals on the storage opening, the side of the central top panel and the sides of the side panels;
   at least one optical identification device, assembled at one of the assembly terminals, and comprising: at least one first image capturing unit, at least one second image capturing unit, and at least one third image capturing unit, a beam receiving and calibrating unit, an estimation and processing unit, at least one transmission module, and a power supply module, wherein:

the image capturing units emitting a plurality of laser beams or a plurality of LED beams onto the contours and spatial dimensions of the plurality of objects in the accommodating space, and capturing a plurality of spatial image information, the wavelength range of the laser beams ranging from 1300 nm to 1400 nm;

the beam receiving and calibrating unit being coupled to the image capturing units and used to use at least one spatial image information of a reference object with built-in length, width, and height dimensions, to obtain a spatial scale information for calibrating a scale, and converting the corresponding transmission and reflection paths of the laser beams or the LED beams into a plurality of first structured beams, a plurality of second structured beams, and a plurality of third structured beams for calculating to form a plurality of object image information and a plurality of beam flight time information;

the estimation and processing unit being coupled to the beam receiving and calibrating unit, used to receive the plurality of object image information and the plurality of beam flight time information provided by the image capturing units, and forming at least one storage location information of the object under measurement in measurement environment and at least one container volume information;

the transmission modules being respectively coupled to the first image capturing unit, the second image capturing unit, the third image capturing unit, the beam receiving and calibrating unit, and the estimation and processing unit; and the power supply module being coupled to the transmission module; and at least one monitoring device, connected to the transmission module to receive the storage location information and the container volume information.

2. The time-of-flight identification system according to claim 1, wherein the structured light beams are projected into an image projection area and form a plurality of superimposed patterns, and the image projection area comprises a plurality of sub-projection areas arranged in an array and adjacent to one another, and the pattern distribution of the superimposed patterns in each sub-projection area is different from one another, and a plurality of object image information and a plurality of beam flight time information are formed by calculation.

3. The time-of-flight identification system according to claim 1, wherein the optical identification device emits the laser beams, the wavelength of laser beams is 1310 nm, and the first image capturing unit is used to identify the space range from the storage opening to within 5 meters, and the second image capturing unit is used identify the space range from the storage opening to within 10 meters, and the third image capturing unit is used to identify the space range from the storage opening to within 18 meters.

4. The time-of-flight identification system according to claim 1, wherein field of view (FOV) of the optical identification device has a horizontal viewing angle range of 0 to 120 degrees, and a vertical viewing angle range of 0 to 90 degrees.

5. The time-of-flight identification system according to claim 1, wherein the transmission module comprises at least one antenna unit, at least one signal transmission unit, and at least one power transmission unit, and the transmission module is used for information transmission of wireless signals or wired signals.

6. The time-of-flight identification system according to claim 5, wherein the monitoring device is a vehicle computer, the container is installed on a vehicle carrier, the transmission module is connected to at least one control area network bus of the monitoring device in the vehicle carrier, and the control area network bus is one or a combination of a local interconnect network or a controller area network; the transmission module is connected to the monitoring device through the Ethernet signal of the signal transmission unit.

7. The time-of-flight identification system according to claim 5, wherein the monitoring device is a server, the server is disposed with a logistics measurement management platform, and the wireless signal information transmission of the monitoring device is the antenna unit selected from one of the Bluetooth, third-generation mobile communication (3G), fourth-generation mobile communications (4G), wireless local area network (Wi-Fi), wireless local area network (WLAN), and fifth-generation mobile communications (5G) wireless communication protocols to connect to the server; the information transmission of the wired signal of the monitoring device is that the transmission module connects to the server with an Ethernet signal through the signal transmission unit.

8. An identification method of the time-of-flight identification system for warehousing and freight transportation according to claim 1, wherein:

the image capturing unit of the optical identification device emitting a plurality of laser beams or a plurality of LED beams onto the contours and spatial dimensions of the plurality of objects in the accommodating space, the wavelength range of the laser beams ranging from 1300 nm to 1400 nm;

scanning the contour of the plurality of objects to be loaded and the internal size of the accommodating space, and capturing a plurality of spatial image information;

obtaining contour data of the objects to be loaded, wherein the beam receiving and calibrating unit using a spatial image information of at least one reference object with built-in length, width, and height dimensions to obtain spatial scale information to calibrate a scale;

the beam receiving and calibrating unit converting the corresponding transmission and reflection paths of the laser beams into a plurality first structured beams, a plurality of second structured beams, and a plurality of third structured beam, and calculating to form a plurality of image information of the object to be loaded and a plurality of beam flight time information;

the estimation and processing unit receiving the plurality of image information of the object to be measured and a plurality of beam flight time information provided by the image capturing units to calculate and process to form a plurality of storage location information of the object to be loaded in a measurement environment and a plurality of container volume information;

the optical identification device performing an identification process based on the storage location information and the container volume information to determine whether loading space satisfying the loading requirement and whether the total weight exceeding load-limit of the container;

when the loading space not satisfying the loading requirement, the transmission module sending an alarm notification message to the monitoring device;

when the loading space satisfying the loading requirement, the transmission module sending a full-load notification message to the monitoring device;

when the total weight exceeding the load-limit of the container, the transmission module sending a full-load notification message to the monitoring device.

9. The identification method according to claim 8, wherein the optical identification device emits the laser beams, the wavelength of laser beams is 1310 nm, and the first image capturing unit is used to identify the space range from the storage opening to within 5 meters, and the second image capturing unit is used identify the space range from the storage opening to within 10 meters, and the third image capturing unit is used to identify the space range from the storage opening to within 18 meters.

10. The identification method according to claim 8, wherein the structured light beams are projected into an image projection area and form a plurality of superimposed patterns, and the image projection area comprises a plurality of sub-projection areas arranged in an array and adjacent to one another, and the pattern distribution of the superimposed patterns in each sub-projection area is different from one another, and a plurality of object image information and a plurality of beam flight time information are formed by calculation.

* * * * *